United States Patent
Busche et al.

(10) Patent No.: US 6,714,893 B2
(45) Date of Patent: Mar. 30, 2004

(54) ENHANCED CONCERN INDICATOR FAILURE PREDICTION SYSTEM

(75) Inventors: Frederick D. Busche, Highland Village, TX (US); William D. Calkins, Dallas, TX (US); Jeffrey D. Kish, Nazareth, PA (US); Scott L. Swain, Novi, MI (US)

(73) Assignee: International Business Machines Corporation, Armonk, NY (US)

( * ) Notice: Subject to any disclaimer, the term of this patent is extended or adjusted under 35 U.S.C. 154(b) by 218 days.

(21) Appl. No.: 10/077,019

(22) Filed: Feb. 15, 2002

(65) Prior Publication Data

US 2003/0158702 A1 Aug. 21, 2003

(51) Int. Cl.$^7$ ............................. G06F 17/18; G06F 17/30
(52) U.S. Cl. ........................................... 702/181; 707/10
(58) Field of Search .............................. 702/181; 707/10

(56) References Cited

U.S. PATENT DOCUMENTS

| | | | |
|---|---|---|---|
| 5,245,554 A | * 9/1993 | Tsuyama et al. | 702/185 |
| 5,531,122 A | 7/1996 | Chatham et al. | 73/760 |
| 5,581,694 A | 12/1996 | Iverson et al. | 395/183.02 |
| 5,692,107 A | * 11/1997 | Simoudis et al. | 706/12 |
| 5,802,518 A | 9/1998 | Karaev et al. | 707/9 |
| 5,822,218 A | 10/1998 | Moosa et al. | 364/488 |
| 5,852,793 A | 12/1998 | Board et al. | 702/56 |
| 5,917,724 A | 6/1999 | Brousseau et al. | 364/186 |
| 5,986,281 A | 11/1999 | Burchanowski et al. | 257/48 |
| 5,991,707 A | 11/1999 | Searles et al. | 702/185 |
| 6,049,741 A | 4/2000 | Kawamura | 700/80 |
| 6,067,544 A | 5/2000 | Moore | 707/6 |
| 6,088,676 A | * 7/2000 | White, Jr. | 705/1 |
| 6,100,901 A | 8/2000 | Mohda et al. | 345/440 |
| 6,188,423 B1 | 2/2001 | Pou | 347/211 |
| 6,243,628 B1 | 6/2001 | Bliley et al. | 701/29 |
| 6,249,887 B1 | 6/2001 | Gray et al. | 714/47 |
| 6,253,336 B1 | 6/2001 | Moore | 714/38 |
| 6,266,668 B1 | * 7/2001 | Vanderveldt et al. | 707/10 |
| 6,567,814 B1 | * 5/2003 | Bankier et al. | 707/101 |

FOREIGN PATENT DOCUMENTS

| | | | | |
|---|---|---|---|---|
| EP | 1 168 198 A2 | * 2/2002 | ........... | G06F/17/30 |
| JP | 10134086 A | 5/1998 | ........... | G06F/17/30 |
| JP | 2000353177 A | 12/2000 | ........... | G06F/17/30 |

OTHER PUBLICATIONS

"Predictive Data Mining: Practical Examples", Velickov et al., Artificial Intelligence in Civil Engineering Proc. $2^{nd}$ Joint, Workshop, Germany, Mar. 2000.*

* cited by examiner

*Primary Examiner*—John Barlow
*Assistant Examiner*—Toan M Le

(57) ABSTRACT

An enhanced concern indicator failure prediction system is provided to predict possible product failures with automatic notification of people as well as systems. The system integrates data mining, spatial analysis, linear programming, narrowcasting, data warehousing, visualization, and text mining. As a result, failure conditions, attributes, complaints, locations, consequences, and sequence of events are analyzed using data mining technologies. This data is fed into an optimization module that assesses the efficiency of the failure process such that failures can be assessed as to their priority. These priorities are then used to feed a triggering engine that triggers notification of systems and individuals using narrowcasting technology. This system is one that allows early warning of potential problems to occur and integrates data from call centers, legacy systems, retailers, manufacturers, vendor supplied parts, and transportation of parts.

28 Claims, 3 Drawing Sheets

ENHANCED CONCERN INDICATOR FAILURE PREDICTION SYSTEM

CROSS REFERENCE TO RELATED APPLICATIONS

The present invention is related to the following applications entitled "METHOD AND SYSTEM FOR INTEGRATING SPATIAL ANALYSIS AND DATA MINING ANALYSIS TO ASCERTAIN FAVORABLE POSITIONING OF PRODUCTS IN A RETAIL ENVIRONMENT", U.S. application Ser. No. 09/400,583, "METHOD AND SYSTEM FOR INTEGRATING SPATIAL ANALYSIS AND DATA MINING ANALYSIS TO ASCERTAIN WARRANTY ISSUES ASSOCIATED WITH TRANSPORTATION PRODUCTS", U.S. application Ser. No. 09/401,109, now U.S. Pat. No. 6,493,723, and "METHOD AND SYSTEM FOR INTEGRATING SPATIAL ANALYSIS AND DATA MINING ANALYSIS TO ASCERTAIN RELATIONSHIPS BETWEEN COLLECTED SAMPLES AND GEOLOGY WITH REMOTELY SENSED DATA", U.S. application Ser. No. 09/400,776, now U.S. Pat. No. 6,430,547, all of which were filed Sep. 22, 1999, and "METHOD AND SYSTEM FOR INTEGRATING SPATIAL ANALYSIS, DATA MINING ANALYSIS, AND SCHEDULING TO EFFICIENTLY SCHEDULE AND MONITOR INFRASTRUCTURE MAINTENANCE", U.S. application Ser. No. 09/619,408, filed on Jul. 19, 2000, now U.S. Pat. No. 6,496,814, and U.S. application Ser. No. 09/838,732, filed on Apr. 19, 2001, all of which are assigned to the same assignee, and incorporated herein by reference.

BACKGROUND OF THE PRESENT INVENTION

1. Field of the Invention

The present invention relates to data processing and, in particular, to failure prediction. Still more particularly, the present invention provides a method, apparatus, and program for using data mining, spatial analysis, linear programming, narrowcasting, data warehousing, visualization, and text mining in a failure prediction system.

2. Background of the Invention

Product failures may lead to various consequences. Typically, when a product defect is discovered, the product is recalled. However, the product defect may be discovered only after catastrophic consequences are suffered. For example, an infant car seat may be recalled only after numerous injuries or possibly deaths. Preferably product defects and their subsequent repair under warranty would trigger timely actions that would minimize the liability and expenses associated with the defect.

Product failures can also be costly in public relations for a manufacturer. Particularly when the safety of consumers is threatened, public perception may be damaged. Even if only one part or model is found to be defective, trust and loyalty in a brand name may be destroyed. Thus, great cost may be expended in restoring the trust of consumers.

Furthermore, a product failure may have an effect on other related companies. For example, an automobile manufacturer may factory install a particular brand and model of tires on automobiles. If that particular model of tires has a defect, failures could result in injuries and possibly loss of life. Both the tire manufacturer and automobile manufacturer may find themselves buried in law suits, recalls, and public relation problems.

Therefore, it would be advantageous to provide an improved system for predicting failures to avoid unnecessary risk to the public and inestimable cost to the manufacturer.

SUMMARY OF THE INVENTION

The present invention provides a system and method to predict possible product failures with automatic notification of people as well as systems. The present invention integrates data mining, spatial analysis, linear programming, narrowcasting, data warehousing, visualization, and text mining. As a result, failure conditions, attributes, complaints, locations, consequences, and sequence of events are analyzed using data mining technologies. This data is fed into an optimization module that assesses the efficiency of the failure process such that failures can be assessed as to their priority. These priorities are then used to feed a triggering engine that triggers notification of systems and individuals using narrowcasting technology. This system is one that allows early warning of potential problems to occur and integrates data from call centers, legacy systems, retailers, manufacturers, vendor supplied parts, and transportation of parts.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENTS

Figure 1:
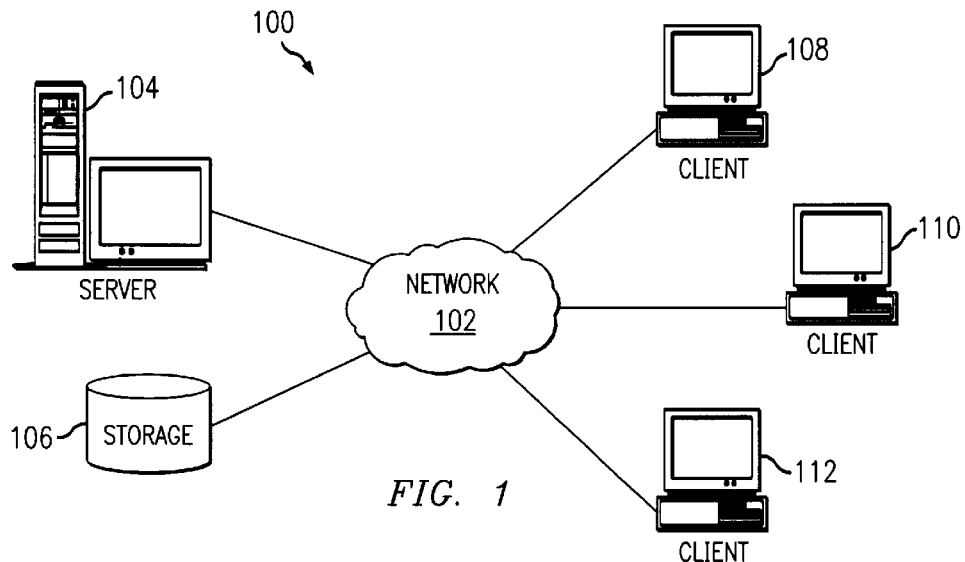
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

The present invention provides a method and apparatus for evaluating product data to predict product failures. Products data, such as failure conditions, attributes, complaints, locations, consequences, and sequences of events may be obtained from one or more sources in a distributed data processing system, such as distributed data processing system 100. For example, product data may be obtained from retailer databases, third party data providers, and the like, which may be located remotely but accessible through the network 102.

The present invention may be implemented in a client device or a server. For example, the present invention may be implemented in a server, such as server 104, that obtains customer data from the various sources via the network 102. In response to a request from a client device, such as client device 112, the server 104 may evaluate product data using data mining technologies.

Figure 2:
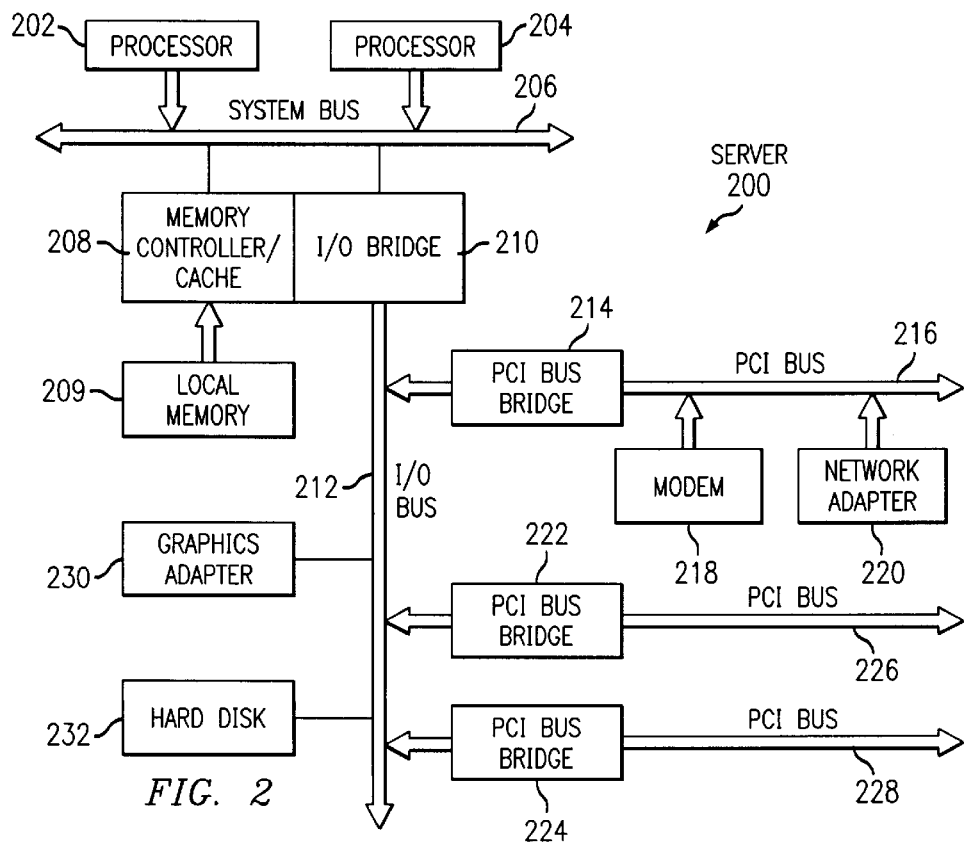
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108–112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Figure 3:
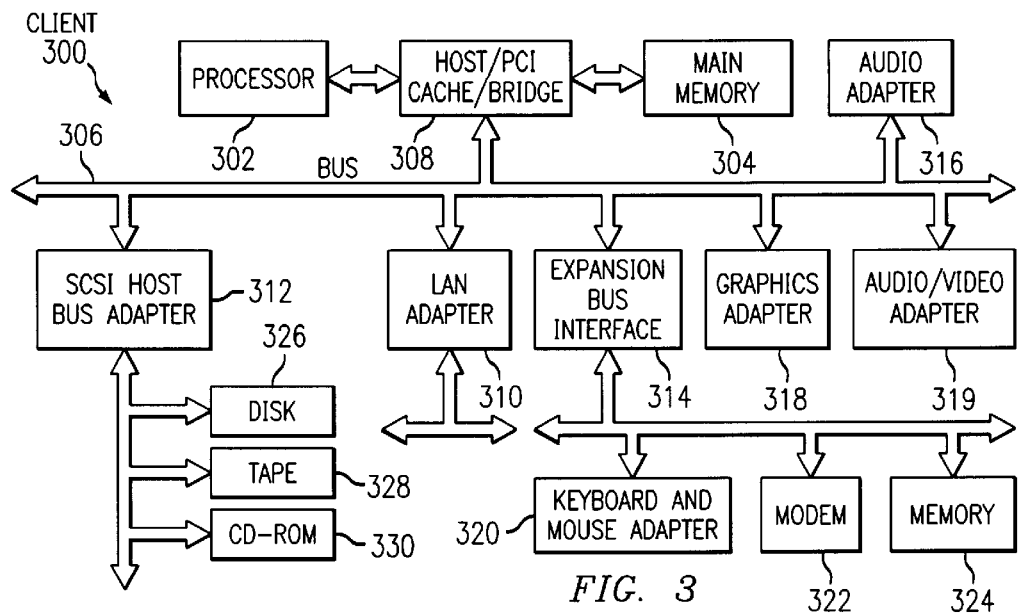
FIG. 3 is a block diagram illustrating a data processing system is depicted in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations.

For example, data processing system 300 also may be a notebook computer or hand held computer in addition to taking the form of a PDA. Data processing system 300 also may be a kiosk or a Web appliance.

The present invention provides a system and method to predict possible product failures with automatic notification of people as well as systems. The present invention integrates data mining, spatial analysis, linear programming, narrowcasting, data warehousing, visualization, and text mining. As a result, failure conditions, attributes, complaints, locations, consequences, and sequence of events are analyzed using data mining technologies. This data is fed into an optimization module that assesses the efficiency of the failure process such that failures can be assessed as to their priority. These priorities are then used to feed a triggering engine that triggers notification of systems and individuals using narrowcasting technology. This system is one that allows early warning of potential problems to occur and integrates data from call centers, legacy systems, retailers, manufacturers, vendor supplied parts, and transportation of parts and the whole.

Figure 4:
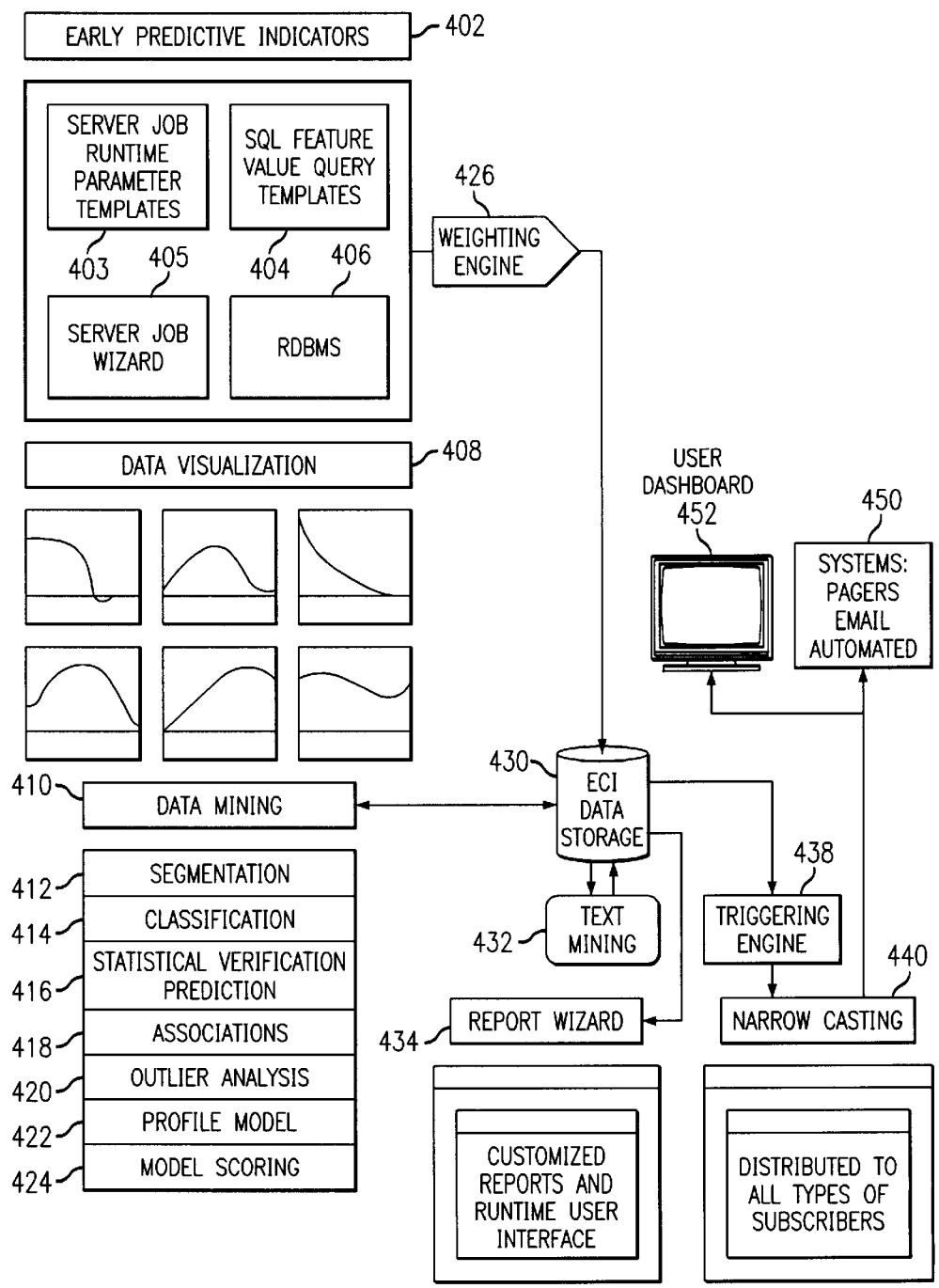
FIG. 4 is an early concern indicator system is shown in accordance with a preferred embodiment of the present invention.

With reference to FIG. 4, an early concern indicator system is shown in accordance with a preferred embodiment of the present invention. Data mining is a process for extracting relationships in data stored in database systems. As is well-known, users can query a database system for low-level information, such as a whether a particular model number appears in service records. Early predictive indicators 402 allow a user to define indicators for predicting possible product failures. Specifically, server runtime parameter templates 403 structured query language (SQL) feature value query templates 404, server job wizard 405, allow a user to define low-level queries of relational database management system (RDBMS) 406.

Data visualization 408 is a visualization framework that gives users the ability to apply advanced visualization and analysis techniques to data. Data visualization 408 provides a set of tools for manipulating, transforming, processing, realizing, rendering and animating data. Insight gained from visualizing data can be used in defining queries and templates or managing data mining profiles.

Data mining 410 builds a set of high-level rules about a set of data, such as "If a product fails a predetermined number of times during a selected period of time at a specified location, then the probability that the product will fail at a given temperature is greater than 20%." These rules allow a user to better understand the relationship between a potential product failure and possible causes or contributing factors. Data mining includes segmentation 412, classification 414, statistical verification prediction 416, associations 418, outlier analysis 420, profile model 422, and model scoring 424.

Segmentation 412 compares entities to see how they might segment naturally. For example, when a "mileage" attribute is considered, the class of the vehicle may segment naturally between high, normal, and low mileage, cars. More specifically, sports utility vehicles may naturally have more mileage than sports cars.

Classification 414 allows a user to put entities into classes based on known data. Classification tries to discover rules that predict whether a record belongs to a particular class based on the values of certain other attributes in that record. In other words, given a set of attributes, one attribute is selected as the "goal," and one desires to find a set of "predicting" attributes from the remaining attributes.

Statistical verification prediction 416 is used to predict the value of attributes by using the information contained in other attributes. Statistical verification prediction may use common statistical analysis techniques, such as linear regression.

Associations 418 find probabilities of combinations of data. An association rule can be developed based on a set of data for which an attribute is determined to be either present or absent. For example, suppose data has been collected on a set of service visits and the attributes are tire brand, complaint type, tire mileage, and total automobile mileage. Associations might identify a strong relationship between a particular tire brand and tire blowouts when the mileage exceeds 50,000 miles.

Outlier analysis 420 is used to find records where some of the attribute values are quite different from the expected values. For example, outlier analysis may be used to find a driver with unusual wear on brake pads or unusually high mileage on a vehicle.

Profile model 422 is a tool to allow a user to specify a model that is used to extract entities from the enhanced concern indicator (ECI) data storage by matching them to the model. These extracts are then analyzed using data mining.

Model scoring 424 is the technique of using an existing model to evaluate other entities by using the common attributes. For example, a model for tire failure might be applied to all automobile records and those automobile owners at high risk contacted.

Weighting engine 426 is an optimization engine that optimizes multiple inputs and multiple outputs. The weighting engine may use the server job runtime parameter templates, SQL feature value query templates, and server job wizard to filter data. Common techniques for optimization are linear programming, non-linear programming, mixed integer programming, decision envelopment analysis. The weighting engine may also use scoring from data mining 410 to optimize inputs and outputs to ECI data storage 430.

ECI data storage 430 provides a data warehouse for the prediction system. Data warehousing is the storage of raw data itself. One of the most common techniques for data warehousing is a relational database. However, other techniques are possible, such as hierarchical databases or multidimensional databases. No matter which type of database is used, it should be able to store points, lines, and polygons such that geographic distributions can be assessed. This type of warehouse or database is sometimes referred to as a spatial data warehouse.

Data is nonvolatile, i.e. read-only, and often includes historical data. The data in the warehouse needs to be "clean" and "integrated". Data is often taken from a wide variety of sources. To be clean and integrated means data is represented in a consistent, uniform fashion inside the warehouse despite differences in reporting the raw data from various sources. The present invention integrates data from call centers, legacy systems, retailers, manufacturers, vendor supplied parts, transportation of parts, and other sources.

The present invention also includes text mining 432. Raw data from sources may include text and other data that must be collected and manipulated. For example, service records may include text describing problems with a product. As an example, a customer may complain about a "squeak" or a "knock" coming from the engine. This information may be collected and manipulated to gather further information that may be used to predict product failures.

Report Wizard 434 is a mechanism that may be used to generate customized reports. The report wizard may also be used to deliver reports to a user via a runtime user interface.

Thus, the present invention integrates the technologies of data mining, spatial analysis, linear programming, data warehousing, visualization, and text mining to predict product failures. Failure conditions, attributes, complaints, locations, consequences, and sequences of events are analyzed using these technologies. This data is fed into an optimization module that assesses the efficiency of the failure process such that failures can be assessed as to their priority. These priorities are then used to feed triggering engine 438 that triggers notification of systems and individuals.

Narrowcasting 440 distributes triggering data to subscribers. Narrowcasting is the technique of distributing pertinent information to the precise destinations that require this information. As contrasted with simply broadcasting information, this technique avoids overloading the destination with information that not immediately useful. For example, a tire distributor may desire to see failure information relating to his tire brands but would not be interested in failure information relating to the brake system. Subscribers may be systems 450, such as pagers, e-mail, or other automated systems. Subscribers may also be people. For example, a person may monitor for failures at user dashboard 452.

Figure 5:
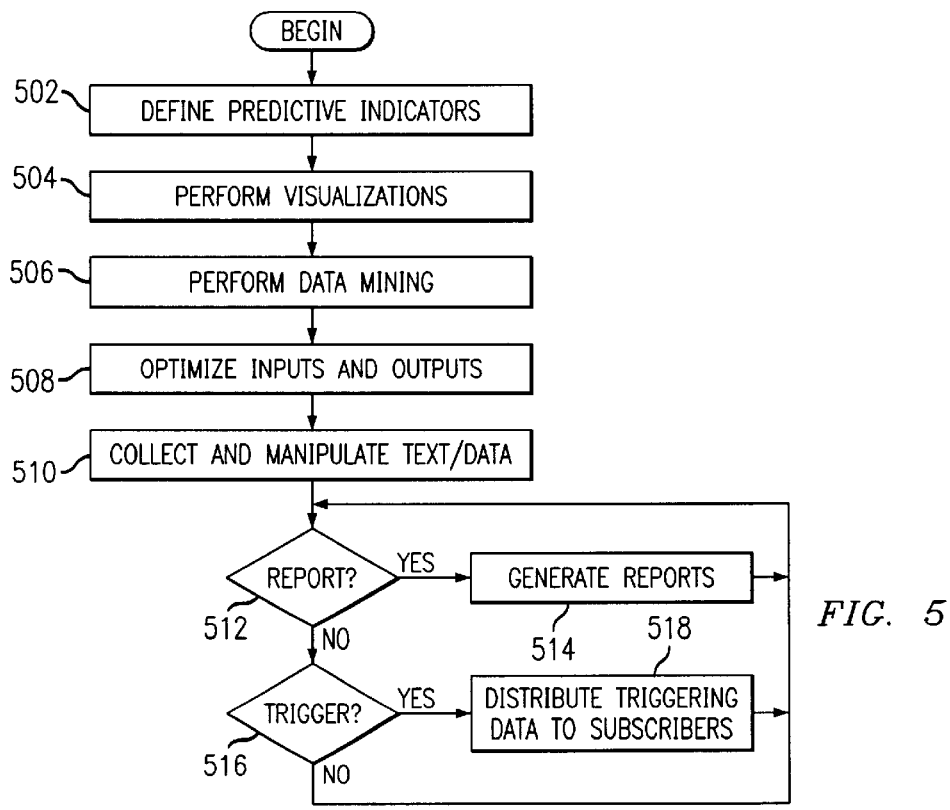
FIG. 5 is a flowchart of an enhanced concern indicator failure prediction system in accordance with a preferred embodiment of the present invention.

With reference now to FIG. 5, a flowchart of an enhanced concern indicator failure prediction system is illustrated in accordance with a preferred embodiment of the present invention. The process begins and a user defines predictive indicators (step 502), performs visualizations (step 504), and performs data mining (step 506). The process optimizes inputs and outputs (step 508) and collects and manipulates text/data (step 510).

A determination is made as to whether a report is to be generated (step 512). If a report is to be generated, the process generates a report (step 514) and returns to step 512 to determine whether a report is to be generated. If a report is not to be generated in step 512, a determination is made as to whether triggering data is discovered (step 516). If triggering data is discovered, the process distributes the triggering data to subscribers (step 518). If triggering data is not discovered in step 516, the process returns to step 512 to determine whether a report is to be generated.

Thus, the present invention allows early warning of potential problems. The present invention integrates data mining, spatial analysis, linear programming, narrowcasting, data warehousing, visualization, and text mining. As a result, failure conditions, attributes, complaints, locations, consequences, and sequence of events are analyzed using data mining technologies. As a result, the present invention allows the notification of people and systems if potential failure is predicted, thus allowing costly and potentially catastrophic consequences to be avoided.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, CD-ROMs, and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for predicting product failures, comprising:

defining predictive indicators;

performing data mining on product data using the predictive indicators;

determining whether triggering data is discovered by the data mining; and distributing triggering data to subscribers if triggering data is discovered.

2. The method of claim 1, further comprising performing data visualization on the product data.

3. The method of claim 2, wherein the step of defining predictive indicators comprises defining predictive indicators based on results of the data visualization.

4. The method of claim 2, wherein the step of performing data mining comprises performing data mining based on results of the data visualization.

5. The method of claim 1, wherein the data mining comprises at least one of segmentation, classification, statistical verification prediction, associations, outlier analysis, profile modeling, and model scoring.

6. The method of claim 1, further comprising using a weighting engine to optimize multiple inputs from the predictive indicators and multiple outputs to product data storage.

7. The method of claim 6, wherein the weighting engine optimizes the multiple inputs and multiple outputs using scoring from the data mining.

8. The method of claim 1, further comprising performing text mining on the product data to collect and manipulate information that may be used to predict product failures.

9. The method of claim 1, wherein the step of determining whether triggering data is discovered by the data mining comprises:

discovering potential product failures;

assessing priorities of the potential product failures; and sending the assessed priorities to a triggering engine.

10. The method of claim 9, wherein the triggering engine triggers notification of at least one system.

11. The method of claim 10, wherein the at least one system comprises a pager.

12. The method of claim 10, wherein the at least one system comprises an e-mail account.

13. The method of claim 9, wherein the triggering engine triggers notification of an individual at a user dashboard.

14. The method of claim 1, wherein the step of distributing triggering data to subscribers comprises distributing the triggering data using narrowcasting.

15. An apparatus for predicting product failures, comprising:

definition means for defining predictive indicators;

data mining means for performing data mining on product data using the predictive indicators;

determination means for determining whether triggering data is discovered by the data mining; and distribution means for distributing triggering data to subscribers if triggering data is discovered.

16. The apparatus of claim 15, further comprising data visualization means for performing data visualization on the product data.

17. The apparatus of claim 16, wherein the definition means comprises means for defining predictive indicators based on results of the data visualization means.

18. The apparatus of claim 16, wherein the data mining means comprises means for performing data mining based on results of the data visualization means.

19. The apparatus of claim 15, wherein the data mining means comprises tools for performing at least one of segmentation, classification, statistical verification prediction, associations, outlier analysis, profile modeling, and model scoring.

20. The apparatus of claim 15, further comprising a weighting means for optimizing multiple inputs from the predictive indicators and multiple outputs to product data storage.

21. The apparatus of claim 20, wherein the weighting means optimizes the multiple inputs and multiple outputs using scoring from the data mining means.

22. The apparatus of claim 15, further comprising text mining means for performing text mining on the product data to collect and manipulate information that may be used to predict product failures.

23. The apparatus of claim 15, wherein the determination means comprises:

means for discovering potential product failures;

means for assessing priorities of the potential product failures; and means for sending the assessed priorities to a triggering engine.

24. The apparatus of claim 23, wherein the triggering engine triggers notification of at least one system.

25. The apparatus of claim 24, wherein the at least one system comprises a pager.

26. The apparatus of claim 24, wherein the at least one system comprises an e-mail account.

27. The apparatus of claim 23, wherein the triggering engine triggers notification of an individual at a user dashboard.

28. A computer program product, in a computer readable medium, for predicting product failures, comprising:

instructions for defining predictive indicators;

instructions for performing data mining on product data using the predictive indicators;

instructions for determining whether triggering data is discovered by the data mining; and instructions for distributing triggering data to subscribers if triggering data is discovered.

* * * * *